US005351391A

United States Patent [19]

Doutrich et al.

[11] Patent Number: 5,351,391

[45] Date of Patent: Oct. 4, 1994

[54] TOOL FOR ASSEMBLING MODULAR HEADER CONNECTORS AND MODULAR RECEPTACLE CONNECTORS

[75] Inventors: Ray C. Doutrich, Lebanon; Stuart C. Stoner, Lewisberry, both of Pa.

[73] Assignee: E. I. DuPont de Nemours & Company, Wilmington, Del.

[21] Appl. No.: 46,461

[22] Filed: Apr. 12, 1993

Related U.S. Application Data

[63] Continuation of Ser. No. 926,881, Aug. 7, 1992, abandoned.

[51] Int. Cl.[5] .............................................. B23P 19/04

[52] U.S. Cl. ......................................... 29/758; 29/764

[58] Field of Search .................. 29/467, 739, 757-760, 29/764, 33 M, 253, 266; 81/488; 439/355, 372

[56] References Cited

U.S. PATENT DOCUMENTS

| | | | |
|---|---|---|---|
| 3,208,026 | 9/1965 | Ruehlmann . | |
| 3,259,876 | 6/1966 | Norden . | |
| 3,315,219 | 4/1967 | Brinser et al. . | |
| 3,576,520 | 4/1969 | Stauffer . | |
| 3,696,492 | 10/1972 | Baillard | 29/764 X |
| 4,045,868 | 9/1977 | Ammon et al. . | |
| 4,050,769 | 9/1977 | Ammon . | |
| 4,156,553 | 5/1979 | Ammon et al. . | |
| 4,188,715 | 2/1980 | Ammon et al. . | |
| 4,220,393 | 9/1980 | Ammon et al. . | |
| 4,269,468 | 5/1981 | Ammon et al. . | |
| 4,330,163 | 5/1982 | Aikens et al. . | |
| 4,343,528 | 8/1982 | Lucius et al. . | |
| 4,484,792 | 11/1984 | Tengler et al. . | |
| 4,550,962 | 11/1985 | Czeschka . | |
| 4,602,494 | 7/1986 | Carrillo | 29/758 X |
| 4,692,120 | 9/1987 | Feinstein | 29/758 X |
| 4,735,583 | 4/1988 | Rudy, Jr. et al. | 439/355 X |
| 4,767,345 | 8/1988 | Gutter et al. . | |
| 4,776,806 | 10/1988 | Adams . | |
| 4,857,017 | 8/1989 | Erk . | |
| 4,858,309 | 8/1989 | Korsunsky et al. | 29/764 |
| 4,952,172 | 8/1990 | Barkus et al. . | |
| 4,955,819 | 9/1990 | Harting et al. . | |
| 4,995,821 | 2/1991 | Casey | 439/372 X |
| 5,090,920 | 2/1992 | Casey | 81/488 X |

*Primary Examiner*—Peter Dungba Vo

*Attorney, Agent, or Firm*—Woodcock Washburn Kurtz Mackiewicz & Norris

[57] ABSTRACT

Assembly tools for mounting a plurality of modules each of which has a pair of retaining features on a surface thereof, wherein the retaining features are spaced a predetermined distance apart, are characterized by an elongated bar member having an array of grasping elements thereon. The grasping elements engage with the retaining features on the modules to hold the individual modules to the bar.

6 Claims, 9 Drawing Sheets

TOOL FOR ASSEMBLING MODULAR HEADER CONNECTORS AND MODULAR RECEPTACLE CONNECTORS

This is a continuation of application Ser. No. 07/926,881 filed Aug. 7, 1992, now abandoned.

BACKGROUND OF THE INVENTION

1. Field of the Invention

The present invention relates to tools useful for assembling either a plurality of header connector modules or a plurality of receptacle connector modules to form a composite header connector or composite receptacle connector having a desired custom length.

2. Description of the Prior Art

Metral TM header connectors and receptacle connectors, such as those sold by the Electronics Department of E. I. du Pont de Nemours and Company, are available in various standardized lengths. Available header and receptacle modules are discussed generally in the DuPont Connector Systems Product Catalog A, February 1992, Chapter 10. Such header connectors and receptacle connectors may be provided with a keying arrangement to permit mated engagement only between a header connector and its associated receptacle. The keying arrangement utilizes complementary keying blocks that are attachable to retaining features on the housings of the header connector and its associated receptacle connector.

For this purpose the housing of the header connector has retaining features in the form latching tabs disposed along the boundaries of slots provided in the side wall of the header connector housing. The keying block for the header connector has a pair of hook-like anchors that are insertable into the slots and which latch onto the tabs thereby to attach the keying block to the header housing.

In the case of the receptacle connector the retaining features take the form of a pair of arms extending from the exterior of the bottom wall of the receptacle connector housing. The forward portion of each arm is spaced below the bottom wall of the housing and cooperates therewith to define a gap sized to accepts flanges on the keying block. Engagement of the flanges on the keying block within the gaps assists in holding the keying block to the receptacle housing.

The length of each of the various available header connectors or receptacle connectors is an integer multiple of a basic unit length L. In some custom applications, such as header connectors and receptacle connectors useful in implementing IEEE Standard 1301 For Metric Equipment Practice For Microcomputers, 1991, it may be necessary to provide Metral TM header connectors and Metral TM receptacle connectors that exhibit a custom length that is not available in a off-the-shelf product.

Presently, meet such a need it is the practice to mold a housing for a header connector or for a receptacle connector that has a custom length dimension sufficient to meet the application. This is perceived as disadvantageous for a number of reasons. First, tooling for molding is expensive. Moreover, a molded housing precludes the possibility of certain modifications being easily made to the connector.

In view of the foregoing it is believed advantageous to provide tools for assembling a plurality of standard header connectors and receptacle connectors to form header connectors and receptacle connectors of a desired custom length.

SUMMARY OF THE INVENTION

In one aspect the present invention relates to an assembly tool for assembling a custom length header connector from two or more individual header connector modules each having a length that is an integer multiple of a basic unit length L to form a composite header connector having a custom length. Each header connector module has a base with two side walls extending therefrom. In this form of connector module the retaining features on the connector module take the form of a pair of slots formed in one of the side walls of each module. Each slot in each module is spaced an integer multiple of the distance L/2 from an adjacent slot. A portion of each sidewall in the vicinity of the slot in that sidewall defines a latching tab.

The header assembly tool comprises: an elongated bar having a planar upper surface with a leading edge and a trailing edge and first and second lateral ends; and a plurality of grasping elements in the form of anchor hooks arranged in a linear array across the planar surface of the bar between the first and second lateral ends. Each anchor hook in the array is spaced from an adjacent hook by a distance that is an integer multiple of the distance L/2. Further, each anchor hook in the array is sized for entry into a slot in a header connector module. The bar and each module mounted thereon are relatively movable to a latched position in which the anchor hooks on the bar matedly engage with the tabs defined in each header connector module.

In another aspect the present invention relates to an assembly tool for assembling a custom length receptacle from two or more individual receptacle connector modules each having a length that is an integer multiple of a basic unit length L to form a composite receptacle connector having a custom length or at least 2L. Each receptacle connector module has a bottom wall and a pair of end walls, with a plurality of arms depending from the bottom wall. At least two of the arms have an outer lateral surface that is coplanar with an end wall. The outer lateral surfaces on the two arms are spaced by an integer multiple of the distance L. Each arm on the receptacle connector module has a leading and a trailing end with a predetermined width dimension being defined therebetween. A portion of each arm is spaced from the base to define a gap.

The receptacle assembly tool includes a bar having a planar surface with a leading and a trailing edge and first and second lateral ends thereon. The bar has an upstanding wall disposed at the trailing edge of the planar surface. A plurality of upturned lip segments are disposed along the leading edge of the bar while a plurality of ridge segments are disposed on the wall between the first and second lateral ends of the bar. Each ridge segment is in transverse alignment with a corresponding lip segment. A portion of each adjacent lip segment and a portion of each adjacent ridge segment are spaced apart by a distance L, with the transverse dimension between each lip segment and the upstanding wall being equal to the predetermined width dimension of each arm. In use, the tool is mated with a receptacle connector module so that at least some of the ridge segments on the wall are received within at least some of the gaps defined on the module while the trailing end of at least some of the arms contacts against some of the lip segments on the bar.

BRIEF DESCRIPTION OF THE DRAWINGS

The invention will be more fully understood from the following detailed description, taken in accordance with the accompanying drawings, which form a part of this application and in which:

FIG. 1A is a front elevational view illustrating a plurality of individual prior art header modules aligned in abutting adjacency, each module having a length that is an integer multiple of a basic unit length L, while

FIGS. 8A and 8B are front and side sectional views, generally similar to FIGS. 1A and 1B, respectively illustrating the relationship of the anchor hooks on the loading bar in accordance with the present invention when in the latched position with a portion broken away to illustrate the mated engagement of the tool and module (FIG. 8B) while

FIG. 9A is a front elevational view illustrating a plurality of individual prior art receptacle modules aligned in abutting adjacency, each module having a length that is an integer multiple of a basic unit length L, while

FIGS. 10A is a perspective view of a tool for assembling a custom length receptacle from two or more individual receptacle modules while

DETAILED DESCRIPTION OF THE INVENTION

Figure 1A:
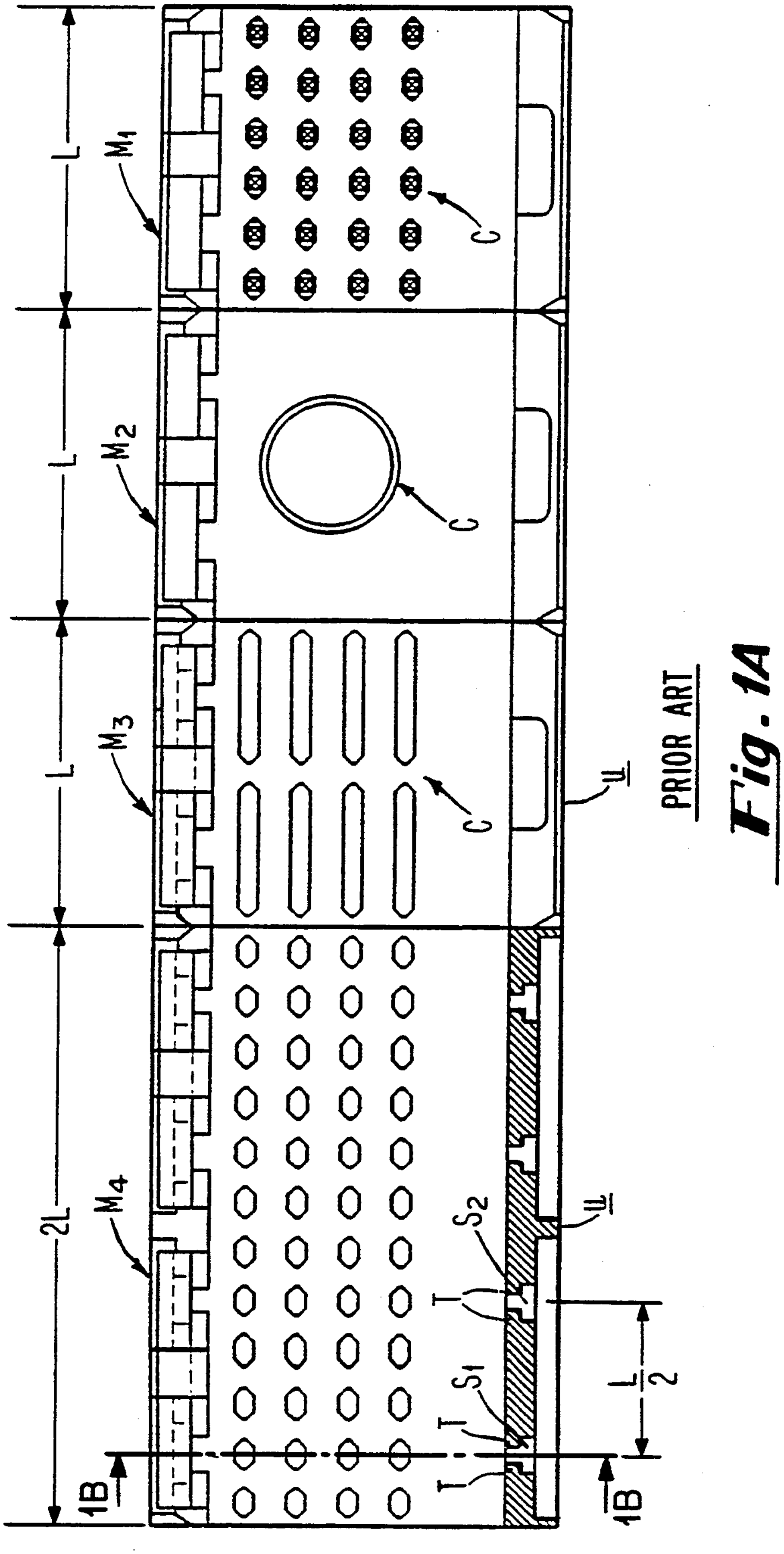
PRIOR ART Fig. 1A

Throughout the following detailed description similar reference numerals refer to similar elements in all Figures of the drawings.

An assembly tool generally indicated by the reference character 10 for forming a composite header connector module from plural header modules each indicated by the character M is discussed first.

Figure 1B:
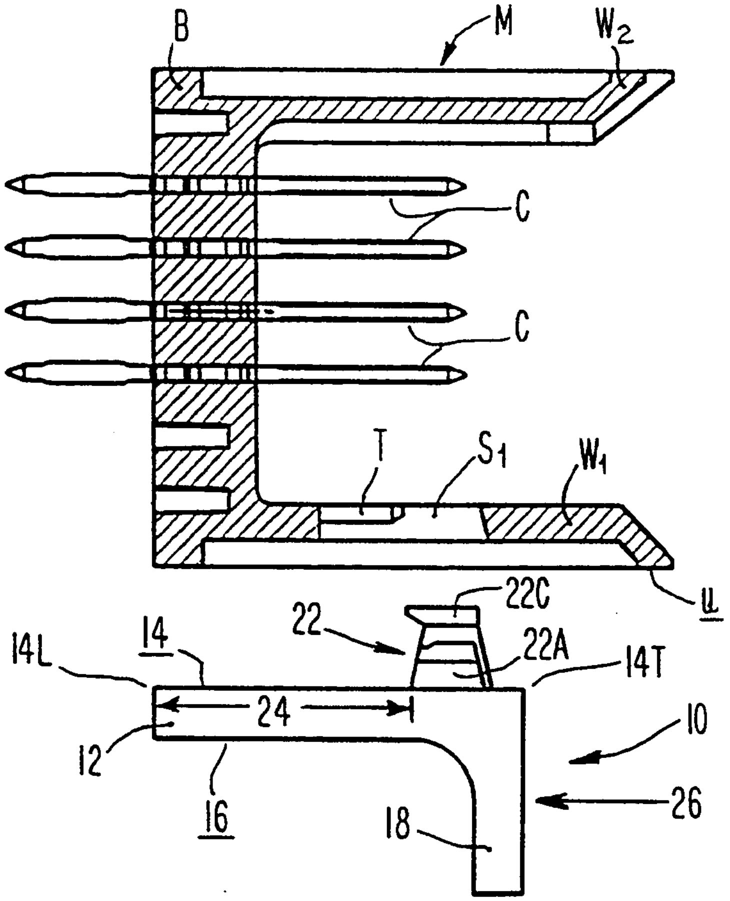
Figure 1B is a side sectional view taken airing any one of section lines 1B—1B in FIG. 1A.

With reference to FIG. 1A shown is a front elevational view of a plurality of individual prior art Metral TM header connector modules $M_1$, $M_2$, $M_3$ and $M_4$ aligned in abutting lateral adjacency. FIG. 1B is a side sectional view taken along any one of section lines 1B—1B in FIG. 1A.

The module $M_1$ is a Metral TM header connector module having a length L dimension. The length dimension L is equal to the basic unit length in accordance with the Metral TM header connector module standard (i.e., twelve millimeters). The header connector module $M_1$ carries an array of contacts C of the signal pin type. Header connector modules $M_2$ and $M_3$ are also Metral TM header connector modules that each have basic unit length L. Header connector module $M_2$ carries a hybrid coaxial/power/guide pin contact C, while header connector module $M_3$ carries an array of bladed power contacts C. Metral TM header connector modules having other standardized lengths that are integer multiples of the basic unit length dimension L are also available. Metral TM header connector module $M_4$ illustrates an example of a header connector module that has a length dimension that is equal to 2L, i.e., a length that is twice the basic unit length dimension L. Header connector modules are generally available having a length (n·L), where n is an integer equal to 1 through 8, although connector modules having higher integer values of n may be obtained. Typically, longer length modules carry the contacts C of the signal pin type.

Each header connector module $M_1$ through $M_4$ is a molded member fabricated from an insulating material, and includes a base B with two side walls $W_1$ and $W_2$ extending therefrom. The tail(s) of the contacts C in each header connector module M extending through the base B thereof.

In accordance with the Metral TM header connector module standard one side wall $W_1$ of each header connector module has retaining features in the form of at least one pair of slots $S_1$, $S_2$ formed therein. A portion of the side wall $W_1$ in the vicinity of each slots $S_1$, $S_2$ defines latching tabs T. As discussed earlier in typical usage the slots $S_1$, $S_2$ each accept keying elements (not shown) that are secured to the header connector module by engagement with the tabs T.

For header connector modules having a length dimension that is an integer multiple of L, a pair of slots is usually provided for each unit distance L, so the slot spacing remains L/2. However, generally speaking, each header connector module has at lest one pair of slots formed therein, with the spacings between slots being an integer multiple of the distance L/2.

Figure 3:
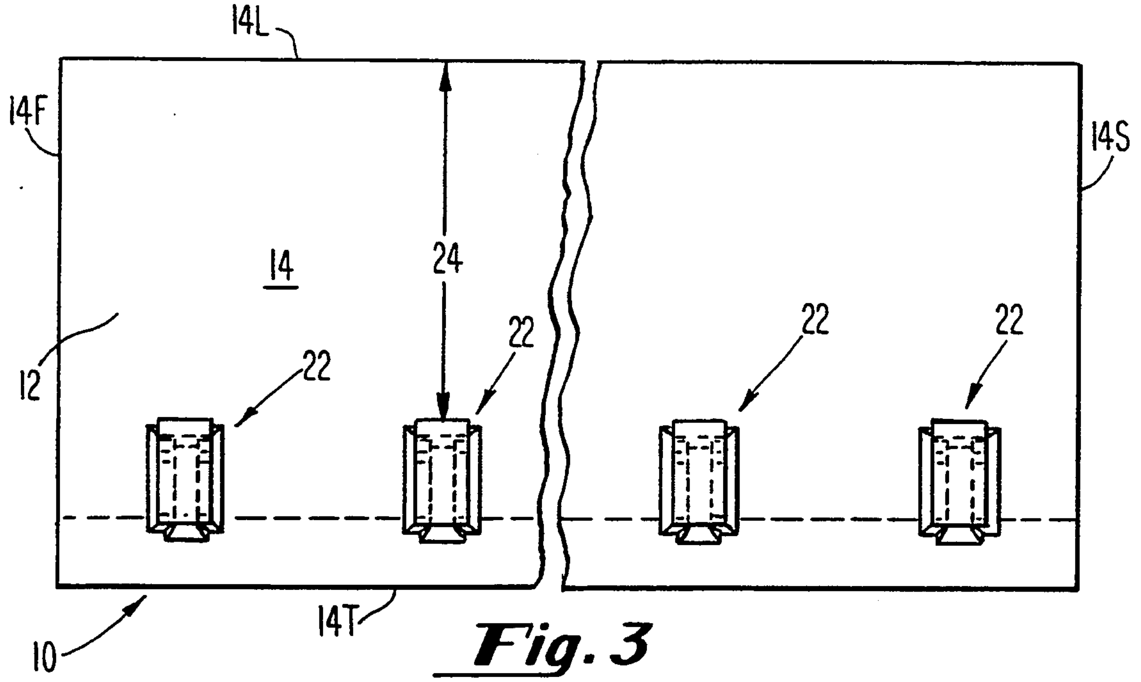
FIGS. 2, 3 and 4 are, respectively, front elevational, plan and side elevational views of a tool for assembling a custom length header from two or more individual header modules in accordance with the present invention.
Figure 2:
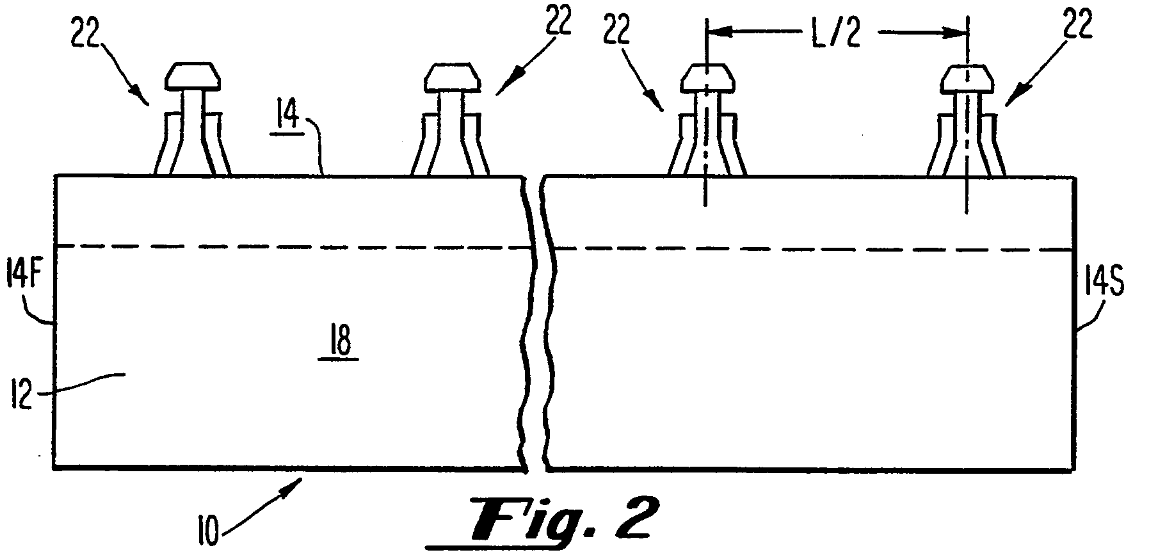
Figure 4:
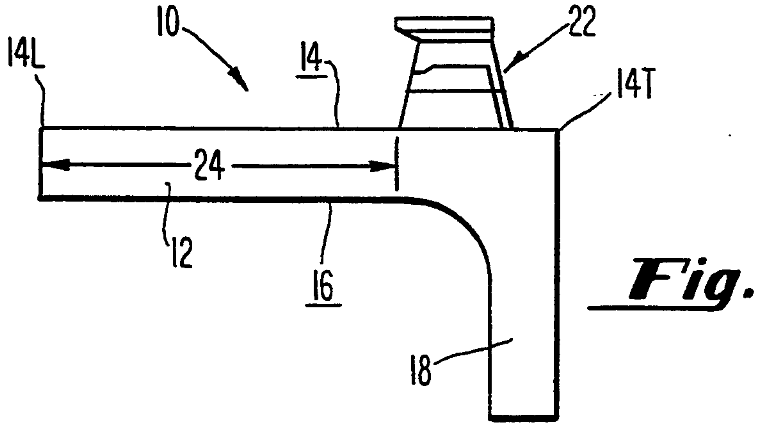

FIGS. 2 through 4 illustrate a tool generally indicated by reference character 10 for assembling a custom length header connector from two or more individual header connector modules, such as the header connector modules $M_1$, through $M_4$, to form a composite header connector module having a custom length. The tool comprises an elongated bar 12 having a planar upper surface 14 and a lower surface 16 thereon. The lower surface 16 may be planar, if desired. The upper surface 14 extends between a first lateral end 14F and a second lateral end 14S. The bar 12 has a leading edge 14L and a trailing edge 14T thereon. The tool 10 may be molded from an insulating material, such as a thermoplastic polymer material. The tool 10 may alternatively be formed from a metal material. The overall length dimension of the bar 12 between the lateral ends 14F, 14S is, preferably, in the range from two to twenty-one times the basic dimension L of the header connector module, although any other multiple may be used. In practice, for considerations of packaging, it is desirable that the overall length dimension of the tool 10 equal the overall length dimension of the composite header connector module.

A manipulating handle 18 is integrally formed with and extends from the lower surface 16 of the bar 14. Preferably, the handle 18 is located adjacent to the trailing edge 14T of the bar 14.

A plurality of grasping elements in the form of anchor hooks 22 is arranged in a linear array across the planar surface 14 of the bar 12 between the first and second lateral ends 14F, 14S. Each anchor hook 22 in the array is spaced from an adjacent hook by a distance that is an integer multiple of the distance L/2. That is to say, the tool 10 can be arranged such that each anchor hook 22 in the array is L/2 from the adjacent hook. However, it lies within the contemplation of this invention to have a nonuniform spacing between some adjacent hooks in the array. In the preferred case the anchor hooks 22 are molded integrally with the material of the tool 10.

Figure 6:
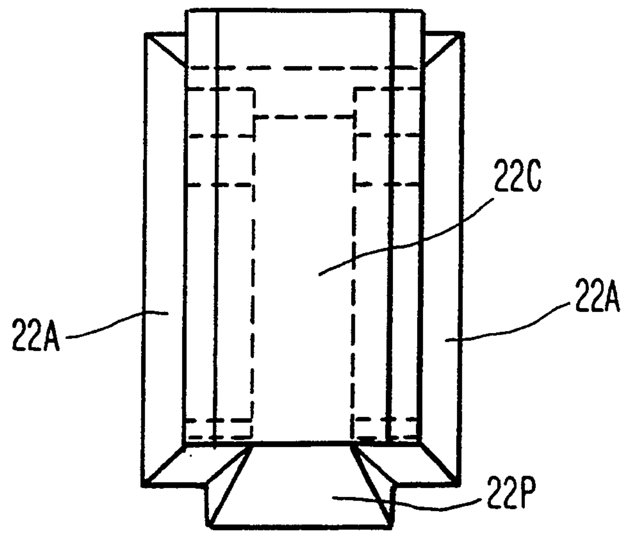
FIGS. 5, 6 and 7 are, respectively, front elevational, plan and side elevational views of an individual anchor hook such as is disposed in a linear array across the assembly tool of FIGS. 2 through 4.
Figure 7:
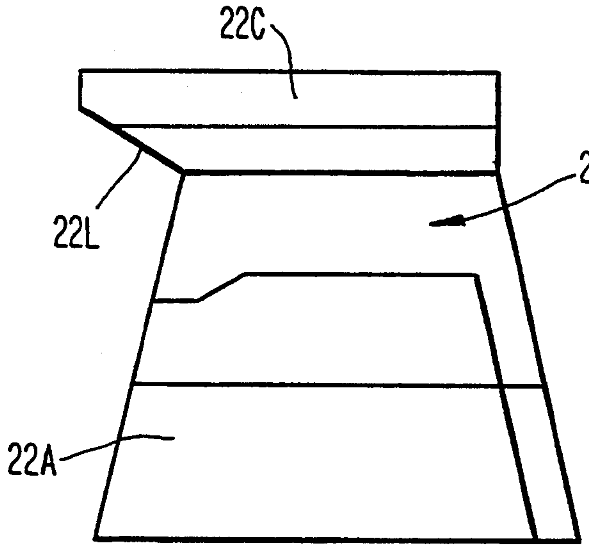
Figure 5:
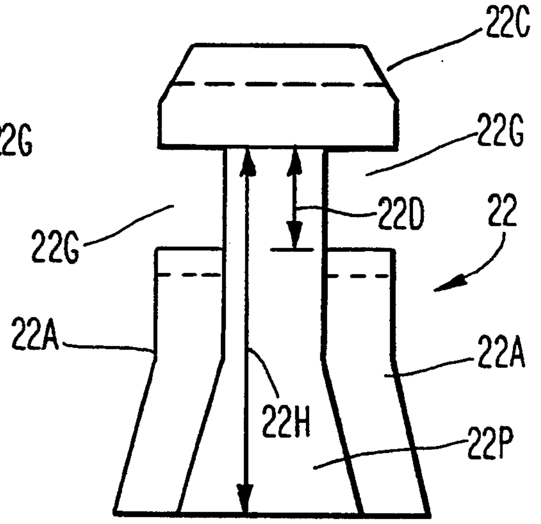

The detail structure of an anchor hook 22 may be best seen in FIGS. 5 through 7. Each anchor hook 22 includes a pedestal 22P that is mounted to the bar 12. The upper end of the pedestal 22P is provided with an enlarged cap portion 22C that imparts a generally T-shaped configuration to each anchor hook 22 when the same is viewed from the end thereof (FIG. 5). As may be best seen in FIG. 7 the leading edge of the cap 22C is undercut to define a lead-in 22L thereon. A pair of enlargements 22A are disposed on each side of the pedestal 22P. The enlargements 22A are spaced a distance 22D below the overhanging arms of the cap 22C to define a groove 22G that extends along each side of the pedestal 22P. As may be seen in FIGS. 3 and 4, the pedestal 22P of each of the anchor hooks 22 is spaced a predetermined transverse distance 24 from the leading edge 14L of the surface 14 of the bar 12 for a purpose to be described.

Figure 8B:
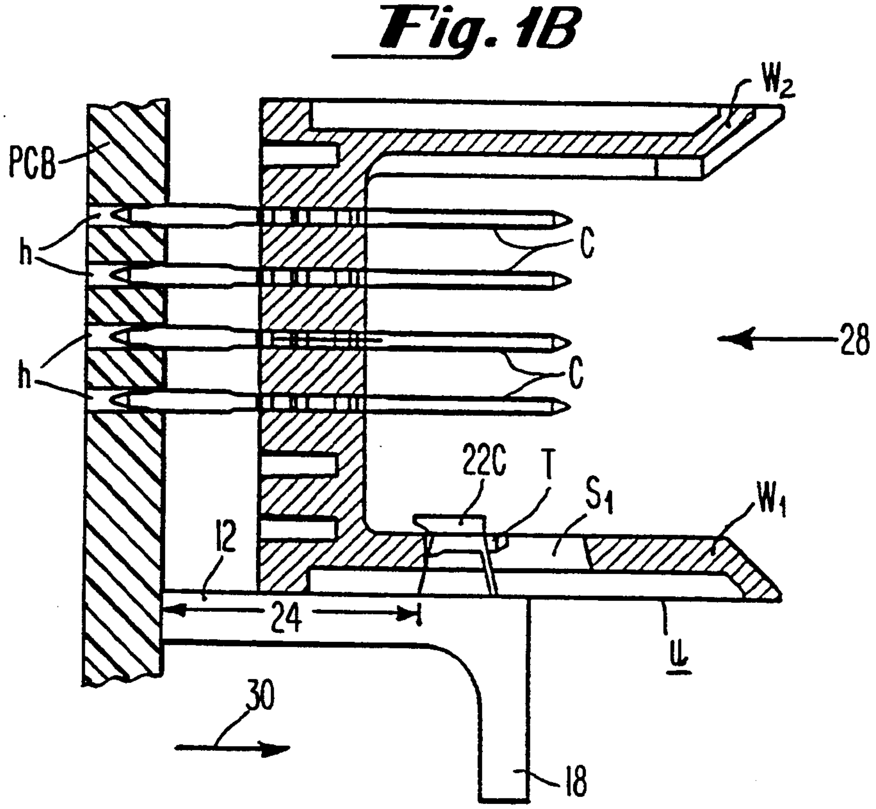
Figure 8A:
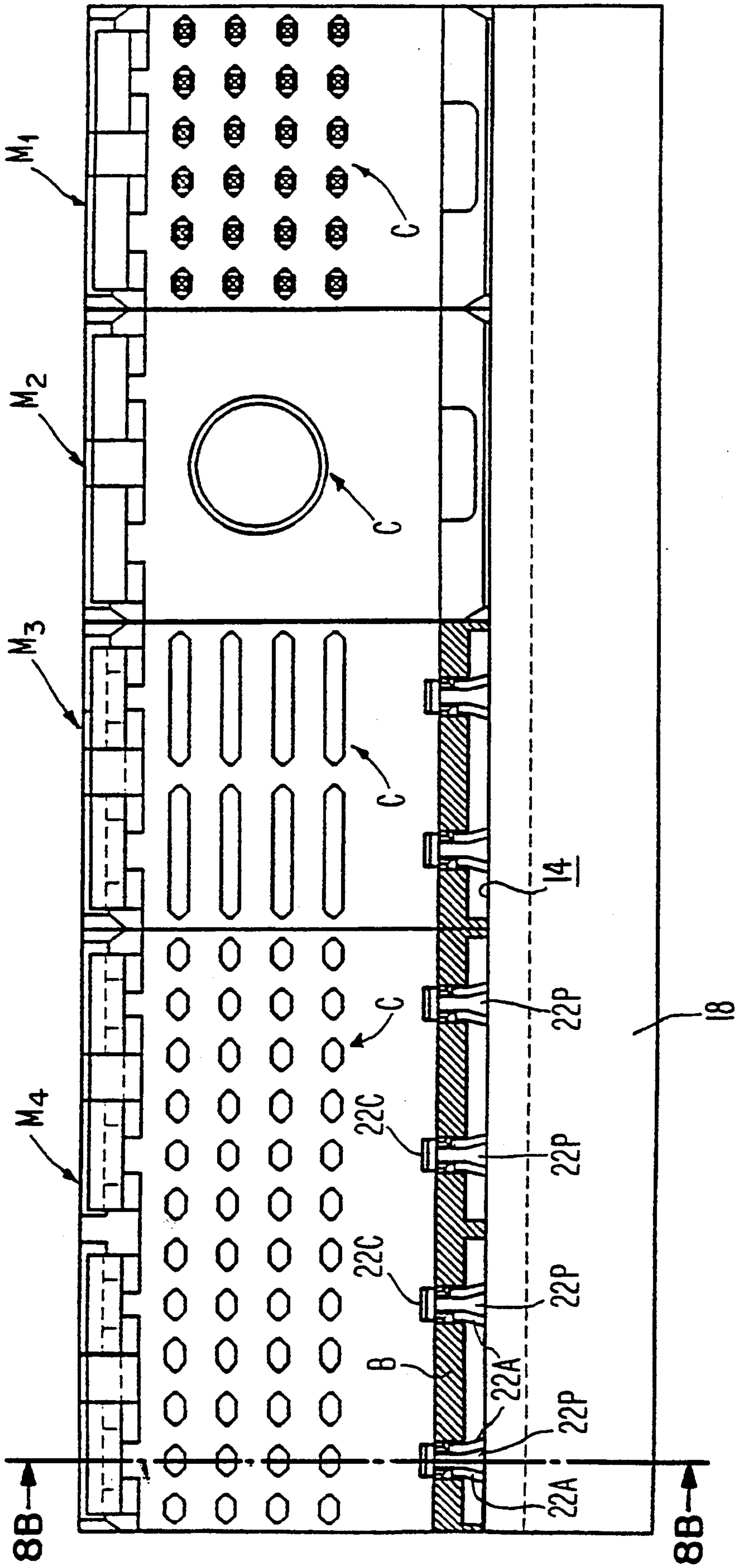
Figure 8C:
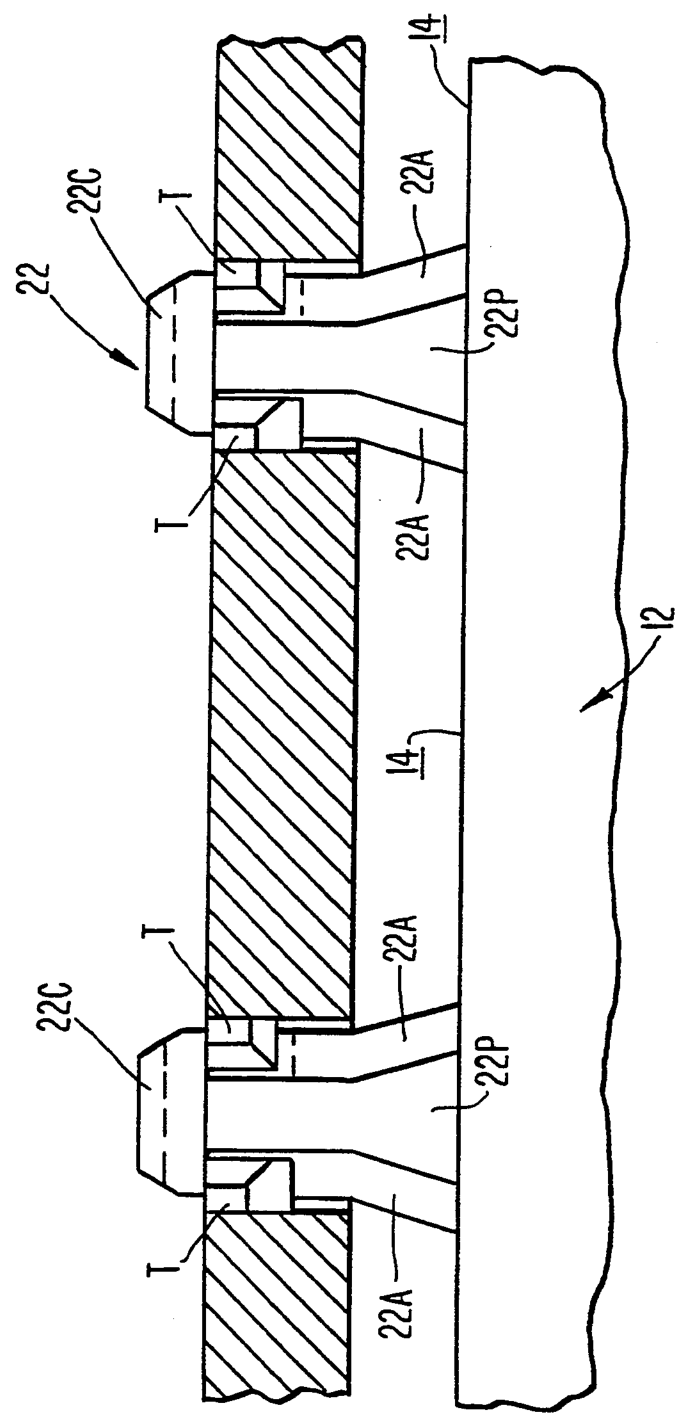
FIG. 8C is an enlargement of a portion of the broken area of FIG. 8A.
Figure 11A:
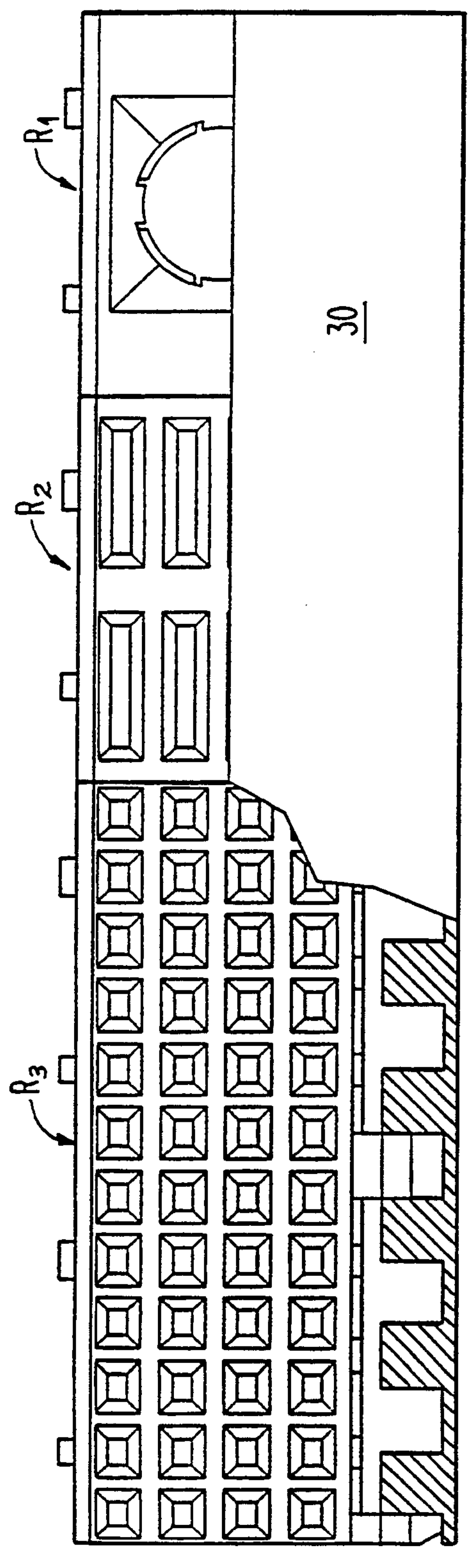
FIGS. 11A and 11B are views similar to FIGS. 9A and 9B, illustrating a tool in accordance with the present invention while in use to form a receptacle of a custom length.

In use, the cap portion 22C of each anchor hook 22 in the array is sized for entry into a slot $S_1$, $S_2$ in each header connector module $M_1$ through $M_4$ (e.g., FIG. 1B). When the tabs T on each header connector module $M_1$ through $M_4$ align with the groove 22G defined along each side of a pedestal 22P the bar 12 is relatively moved in a direction 26 (FIG. 1B) to the mated position shown in FIG. 8B. The direction 26 is generally parallel to the planar surface 14 of the bar 12. As seen best in FIG. 8C, in the mated position the tabs T defined in each header connector module M are grasped between the upper surface of the enlargements 22A and the lower surface of the arms of the cap 22C on each anchor hook 22, thereby trapping the outside surface U (FIG. 1B) of the wall $W_1$ of each module M against the surface 14 of the tool 10. As seen in FIG. 8B the individual header connector modules $M_1$ through $M_4$ are thus held to the tool 10. The fit of the tab T in the groove 22G may be relatively loose so long as the height dimension 22H (FIG. 5) of the pedestal 22P is sufficient to trap tightly the outside surface U against the surface 14.

Depending upon the length dimensions of the individual header connector modules used a composite module having a customized length that is any desired integer multiple of the basic module length L may be assembled through the use of the tool 10 in accordance with the present invention. In the example illustrated, with the header connector modules $M_1$ through $M_4$ used and secured to the tool 10 the assembled composite module has a length (5·L).

The tool 10 may be used to convey the composite header connector module to the board PCB. As the tails of the contacts C are inserted into holes h in the board PCB (FIG. 8B) the leading edge 14L of the tool 10 abuts against the surface of the board. By judicious selection of the transverse dimension 24 as the contacts C enter the holes h in response to an insertion force 28 the tool 10 is urged in the direction 30, thereby releasing the tool 10 from engagement with the header connector modules $M_1$ through $M_4$. In this manner the tool 10 may be unlatched, i.e., separated, from the composite header connector header formed by the use thereof.

Figure 9A:
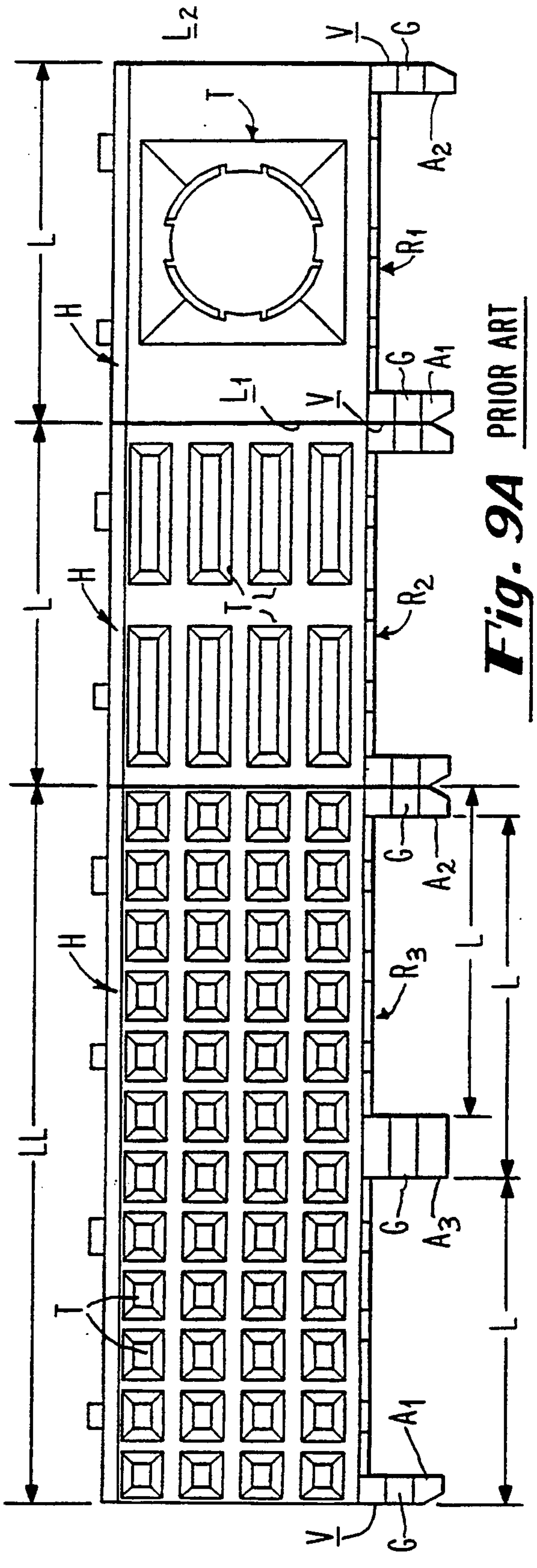
Fig. 9A PRIOR ART
Figure 9B:
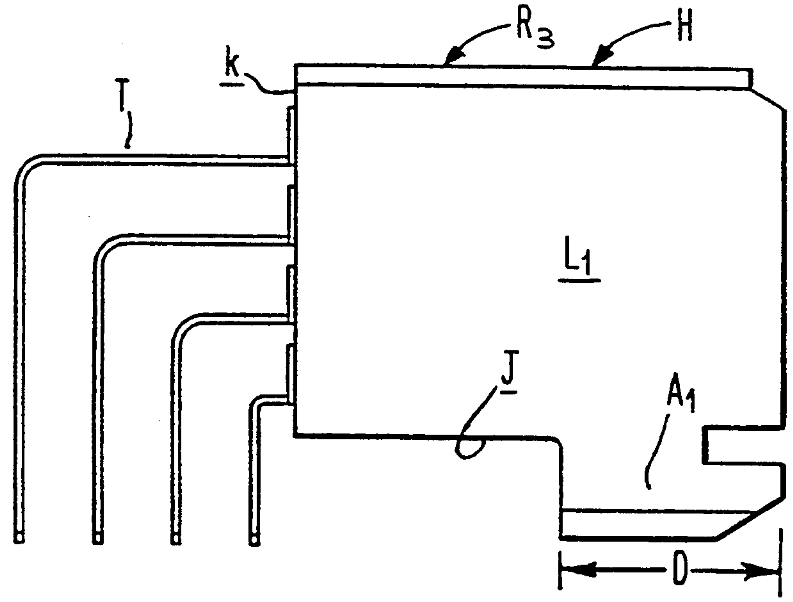
PRIOR ART Fig. 9B
FIG. 9B is a side elevational view of the modules in FIG. 9A.

An assembly tool 30 for forming a composite receptacle connector module from plural receptacle connector modules R is next discussed. With reference to FIG. 9A shown is a front elevational view of a plurality of individual prior art Metral TM receptacle connector modules $R_1$, $R_2$, and $R_3$, aligned in abutting lateral adjacency. Similar to the case with the header connector modules, each receptacle connector module $R_1$ through $R_3$ has a length dimension that is an integer multiple of a basic unit length dimension L. In particular, as seen in FIG. 9A, the receptacle connector modules $R_1$ and $R_2$ each exhibit the basic unit dimension L. The receptacle connector module $R_3$ has a length dimension 2·L.

The receptacle connector module $R_1$ has a terminal T that accepts a hybrid coaxial/power/guide contact, while the array of terminals T of the receptacle connector module $R_2$ accept bladed power contacts. The receptacle connector module $R_1$ has an array of terminals T that accept signal pin contact. Again, the receptacle modules having lengths that are integer multiples of the unit length L carry the terminals T that accept contacts of the signal pin type.

Each receptacle connector module $R_1$ through $R_3$ includes a housing H molded from an insulating material and having a back wall K, a bottom wall J, and two end walls $L_1$, $L_2$. Positioning pegs and/or attachment pegs (not shown) are integrally formed with the housing H. The pegs are received in a press fit manner in openings provided in a board to position the housing H thereon. Heat stakes provided on the bottom wall J are also omitted for clarity. It is noted that the portions of the tails of the terminals that extend below the bottom wall of the housing H are also omitted for clarity of illustration.

The housing H of each receptacle connector module R has retaining features thereon for accepting flanges on the keying blocks. The retaining features take the form of a plurality (i.e., two or more) arms A that extend from the bottom wall j of the housing. The number of arms A depends upon the length of the receptacle connector module. In the case of modules such as the modules $R_1$ and $R_2$ (i.e., modules with a unit length L), a pair of arms $A_1$, $A_2$, depend from the base J. The outer lateral surface V of each of the arms $A_1$, $A_2$, is arranged in coplanar fashion with respect to the end walls $L_1$, $L_2$ of the receptacle connector housing H with which they are associated. Accordingly, the end walls V are spaced by the unit length L.

In receptacle connector modules having greater lengths, as the module $R_3$, three or more arms $A_1$, $A_2$, and $A_3$ depend from the bottom wall J. The outer lateral surfaces V on the pair of arms $A_1$, $A_2$ are coplanar with the end walls of the receptacle and are spaced by an integer multiple of the distance L. Additional arms, when necessary, are located on the bottom wall J intermediate to the end walls $L_1$, $L_2$. The lateral surfaces of the intermediate arm $A_3$ are spaced by the unit distance L from the corresponding lateral surface of an adjacent arm, as illustrated.

Each of the plurality of arms $A_1$, $A_2$ or, if necessary, any additional arms $A_3$, have a transverse dimension D. The forward portion of each arm is spaced from the bottom wall J of the housing H to define a gap G. In accordance with standard prior usage keying blocks (not shown) are receivable by the arms on the receptacle connector modules, with flanges on the keying blocks being accepted and retained within the gaps G between each of the arms A and the bottom wall J.

Figure 10A:
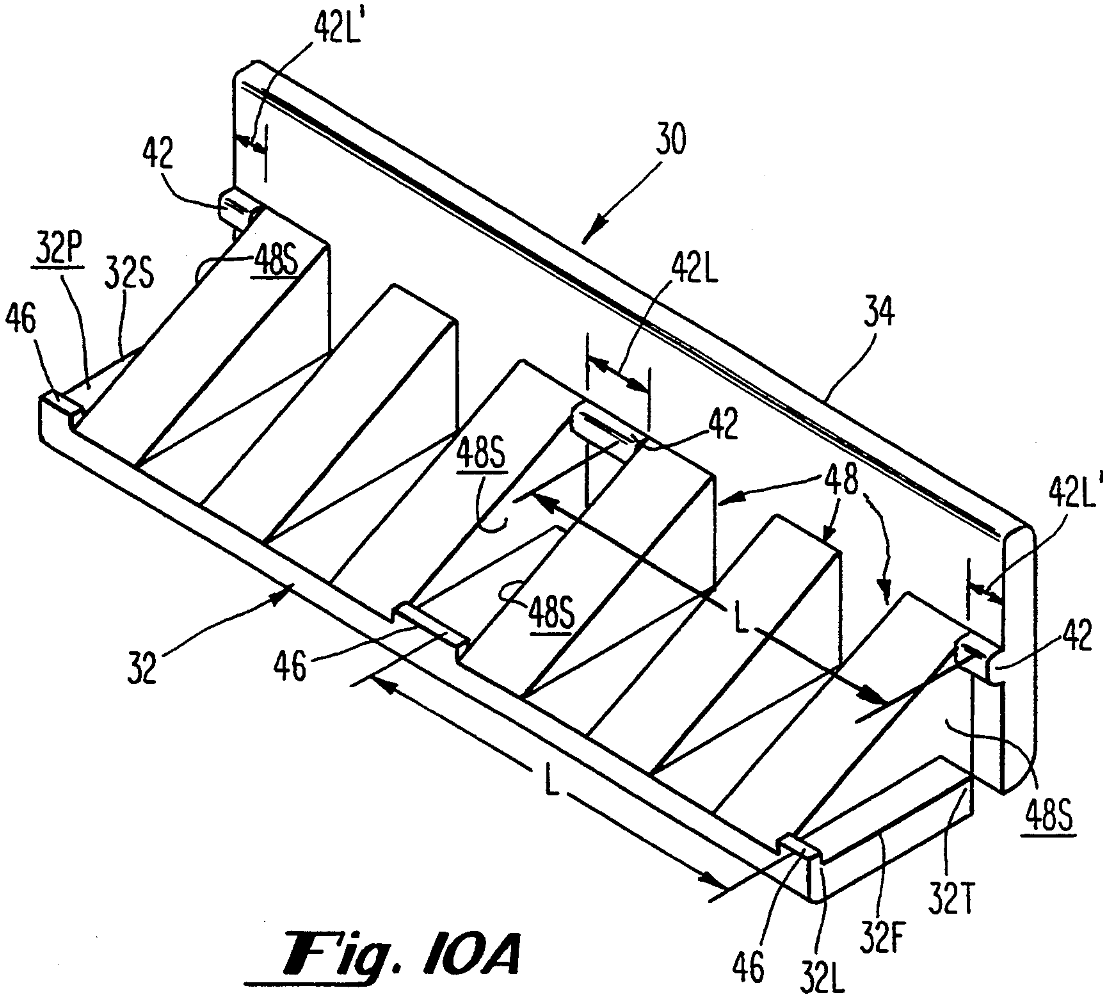
Figure 10B:
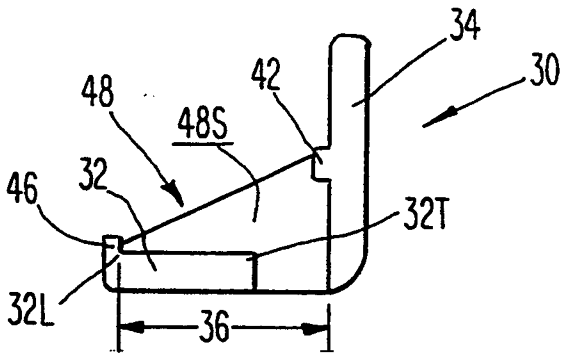
FIG. 10B is a side elevational view of the tool of FIG. 10A.

FIGS. 10A and 10B illustrate a tool 30 for assembling a custom length receptacle from two or more individual receptacle connector modules in accordance with the present invention. The tool 30 comprises a generally L-shaped elongated bar member 32 and a wall 34 attached thereto. Preferably the overall length dimension of the bar 32 between the lateral ends 32F, 32S is, preferably, in the range from two to twenty-one times the basic dimension L of the receptacle connector module, although any other multiple may be used. Again, for considerations of packaging, it is desirable that the overall length dimension of the tool 32 equal the overall length dimension of the composite receptacle connector module.

The bar member 32 has a planar surface 32P with a leading edge 32L, a trailing edge 32T, and first and second lateral ends 32F, 32S, respectively, thereon. The wall 34 is a unitary structure that is disposed at the trailing edge 32T of the bar 32 and extends along the entire length thereof, as shown. A predetermined transverse dimension 36 is defined between the leading edge 32L and the wall 34, the dimension 36 being substantially equal to (i.e., within dimensional tolerances of) the transverse dimension D of the arms A.

A plurality of ridge segments 42 are provided on the wall 34. Each ridge segment 42 has a predetermined length dimension 42L. In practice it is preferred that the length dimension 42L′ of the ridge segments adjacent to the lateral ends of the wall 34 is one-half the length dimension 42L of any ridge segments 42 that lie intermediate to the ends of the wall 34. Portions of each adjacent ridge segment 42 are spaced by a distance L.

Extending along the leading edge 32L of the bar 32 is a plurality of upturned lip segments 46. Each lip segment 46 is in transverse alignment with a corresponding respective ridge segment 42. Corresponding portions of each adjacent lip segment 46 are also spaced by a distance L. Again, in practice it is preferred that the length dimension of the lip segments adjacent to the lateral ends of the bar 32 is one-half the length dimension of any lip segments that lie intermediate to the ends thereof.

Ribbed abutments 48, certain of which have lateral surfaces 48S thereon, are located at spaced axial positions along the length of the bar 32. Portions of the lateral surfaces 48S lie in close proximity to each axial end of the ridge segments 42 and to each axial end of the lip segments 46. The abutments 48 are ribbed for considerations of manufacture, but may be made as unitary members, if desired.

In the preferred instance the tool 30 is fabricated as an integral molded part from an insulating material, such as a thermoplastic polymer material.

Figure 11B:
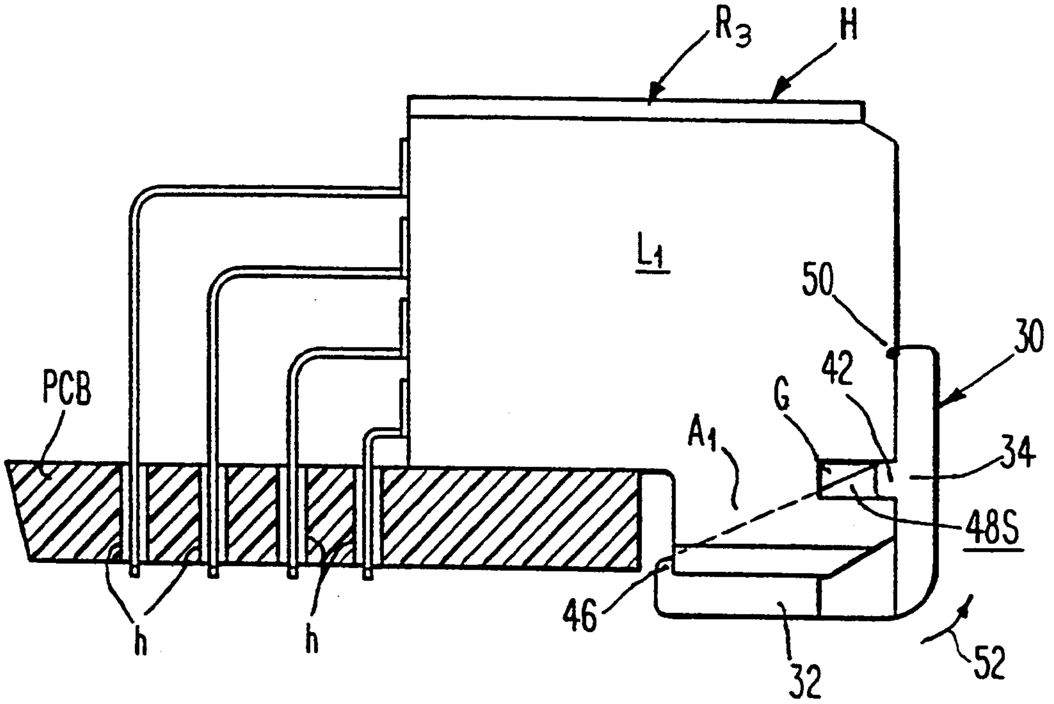

In use, as seen in FIG. 11B, each of a plurality of receptacle connector modules $R_1$, $R_2$, $R_3$ forming a composite receptacle connector of a customized length is pivotally movable about a line of contact 50 with the bar 32 and snaps into mated engagement therewith. At least some of the lip segments 46 on the bar 32 snap behind the trailing end of at least some of the arms on each module. These arms are thereby captured between the lip segment 46 and the wall 34. Moreover, when mated, portions of at least some of the ridge segments 42 on the walls 40 enter into some of the gaps G defined between each of the arms A and the housing H. Abutment between the lateral surfaces 48S and each of the arms A prevents relative axial motion between an individual module and the bar 32. In the preferred instance the tool is fabricated with sufficient numbers of ridge segments 42 and lip segments 46 so that all of the arms on the modules are captured between the lips 46 and the wall 34 and so that a ridge 42 is inserted into each gap between an arm and the bottom wall of the housing. The ridge segments 42 and the lip segments 46 form grasping elements that hold the individual modules to the bar. When assembled some of the ridge segments 42 intermediate to the ends of the wall 34 are received in the gaps G on the arms of adjacent modules.

It may clearly be appreciated that, depending upon the number of receptacle connector modules mounted to the tool 30, a receptacle connector of any customized length may be formed without the necessity of molding a custom housing. The tool 30 serves to carry the composite receptacle connector so formed to the board PCB on which it is to be mounted. The tails of the terminals T of the composite receptacle connector are inserted into openings h provided therefor. When so inserted the tool 30 may be removed by simply withdrawing the bar 32 using a pivotal unsnapping motion (indicated by the arrow 52) to free the lip segments from behind the arms and the ridge segments from the slots G. If desired, a handle (not shown) may be added to the tool 30 at any convenient location to facilitate removal of the tool.

Those skilled in the art, having the benefit of the teachings of the present invention as hereinabove set forth may effect numerous modifications thereto. Such modifications as are discussed herein and which appear to those skilled in the art are to be construed as lying within the scope of the present invention, as defined by the appended claims.

What is claimed is:

1. A tool for assembling a custom length header from two or more individual header modules each having a length that is an integer multiple of a basic unit length L to form a composite header having a custom length of at least 2 L, each module having a base with two sidewalls extending therefrom, a sidewall of each module having at least two slots formed therein, each slot in each module being spaced at least a distance L/2 from an adjacent slot, the tool comprising:

a bar having a planar upper surface with a leading edge and a trailing edge and first and second lateral ends, and a plurality of anchor hooks arranged in a linear array across the planar surface of the bar between the first and second lateral ends, each anchor hook in the array being spaced from an adjacent hook by a distance that is an integer multiple of the distance L/2, each anchor hook in the array being sized for entry into a slot in a module, the bar and each module mounted thereon being relatively movable to a latched position in which the anchor hooks on the bar are in mated engagement with the tabs defined in each module, wherein the bar has a predetermined transverse dimension between the leading edge and the linear array of anchor hooks, the transverse dimension being sized such that the leading edge of the bar extends beyond the base of the module when the anchor hooks are in mated engagement with the tab on the sidewall.

2. The tool of claim 1 wherein the bar has a lower surface thereon, a handle extending from the lower surface of the bar.

3. The tool of claim 2 wherein the handle extends from the lower surface of the bar adjacent to the trailing edge thereof.

4. The tool of claim 3 wherein the handle extends from the lower surface of the bar adjacent to the trailing edge thereof.

5. A tool for assembling a custom length receptacle connector from two or more individual receptacle connector modules, each receptacle connector module having a length that is an integer multiple of a basic unit length L, to form a composite receptacle having a custom length of at least 2 L, each receptacle connector module having a base and a pair of end walls, a plurality of arms depending from the base, at least two of the arms having an outer lateral surface that is coplanar with an end wall, the outer lateral surfaces on the two arms being spaced by an integer multiple of the distance L, each arm on the receptacle connector module having a leading and a trailing end with a predetermined width dimension being defined therebetween, a portion of each arm being spaced from the base to define a gap, the tool comprising:

a bar having a planar surface with a leading and a trailing edge and first and second lateral ends, an upstanding wall disposed at the trailing edge of the planar surface, a plurality of upturned lip segments being disposed along the leading edge of the bar and a plurality of ridge segments being disposed on the wall between the first and second lateral ends of the bar, each ridge segment being in transverse alignment with a corresponding lip segment, a portion of each adjacent lip segment and a portion of each adjacent ridge segment being spaced apart by a distance L, the transverse dimension between each lip segment and the upstanding wall being substantially equal to the predetermined width dimension of each arm, such that, when in the tool is mated with a receptacle connector module, at least some of the ridge segments on the wall are received within at least some of the gaps defined on the module while the trailing end of at least some of the arms contacts against some of the lip segments on the bar.

6. The tool of claim 5 wherein the bar has a longitudinal axis extending therethrough, the tool further comprising stop surfaces disposed on the bar in adjacency to some of the ridge segments and some of the lip segments to prevent relative longitudinal movement of a receptacle connector module with respect to the bar.

* * * * *